US009071368B2

(12) United States Patent
Komm

(10) Patent No.: US 9,071,368 B2
(45) Date of Patent: Jun. 30, 2015

(54) MIXING BOARD FOR AUDIO SIGNALS

(76) Inventor: Christian Komm, Berlin (DE)

( * ) Notice: Subject to any disclaimer, the term of this patent is extended or adjusted under 35 U.S.C. 154(b) by 718 days.

(21) Appl. No.: 13/091,211

(22) Filed: Apr. 21, 2011

(65) Prior Publication Data

US 2011/0261972 A1 Oct. 27, 2011

(30) Foreign Application Priority Data

Apr. 22, 2010 (DE) ......................... 10 2010 018 060
Nov. 22, 2010 (DE) ......................... 20 2010 015 856

(51) Int. Cl.
*H04B 1/00* (2006.01)
*H04H 60/04* (2008.01)
*H04R 1/10* (2006.01)

(52) U.S. Cl.
CPC ..................................... *H04H 60/04* (2013.01)

(58) Field of Classification Search
CPC .............. H04S 7/00; H04R 1/00; H04R 1/10; H04R 2203/01; H04R 2201/0032; H04H 60/04
USPC ........................................ 381/119, 74; 369/4
See application file for complete search history.

(56) References Cited

U.S. PATENT DOCUMENTS 4,201,895 A * 5/1980 Hill, Jr. ............................ 369/4
8,553,504 B2 * 10/2013 Lindahl et al. .................... 369/3

FOREIGN PATENT DOCUMENTS

| | | | |
|---|---|---|---|
| GB | 2431285 | A | 4/2007 |
| WO | 01/11809 | A1 | 2/2001 |
| WO | WO 0111809 | A1 * | 2/2001 |

* cited by examiner

*Primary Examiner* — Vivian Chin
*Assistant Examiner* — Ammar Hamid
(74) *Attorney, Agent, or Firm* — Patent Central LLC; Stephan A. Pendorf

(57) ABSTRACT

A mixing board for sound signals received on at least two channels, which can include the following circuits: a circuit for pre-listening to the sound signals through headphones that can be connected, a circuit for changing the timbre by means of a sound filter, and a circuit for cross-fading and/or mixing sound signals of the channels by means of a cross-fader, and which comprises several outputs, wherein the sound signals received on the channels are headphone output signals of players, the relevant channels are divided by means of circuitry and the signals are passed on to the outputs in parallel and without amplification:

a) through a passive sound filter and subsequently a passive cross-fader to an output to which an amplifier can be connected, and
b) via a switch (6, 7) of the relevant channel to a headphone output of the mixing board, wherein the channels can be selected by means of the switches.

18 Claims, 9 Drawing Sheets prior art

MIXING BOARD FOR AUDIO SIGNALS

BACKGROUND OF THE INVENTION

1. Field of the Invention

The invention relates to a mixing board for sound signals, in particular a mixing board for a disc jockey (DJ) which includes the functions of pre-listening to the sources, changing the timbre, and cross-fading/mixing two sources to one output.

2. Description of the Related Art

Normally, DJ mixing boards process so-called low-frequency analogue signals (commonly called line or cinch signal) or record player signals having standardized voltages.

These signals must be electronically amplified in order to be suitable for processing in a DJ mixing board since signal processing entails signal losses (voltage losses). Electronic amplification always requires a power supply to be available.

As an alternative, digital signal processing can be performed, but this type of signal processing also requires a power supply (GB 2431285 A).

To be able to change the timbre of a sound signal in a DJ mixing board, passive sound filters are normally used. Signal processing by means of passive sound filters, however, entails signal losses (voltage losses). To compensate for said losses, the signal must be amplified with the aid of a power supply either ahead of or behind the filter.

To conveniently cross-fade from one signal source to a second signal source, a cross-fader is used in DJ mixing boards. The circuit connects one signal source with the ground by means of a slide potentiometer (the cross-fader) so that the other source will be heard at the output.

In the middle position, both signal sources can be heard. The analogue circuit of the cross-fader usually entails a voltage division due to two follow-on resistances; in this case, the voltage is divided in half, which must then be compensated for by means of an amplifier including a power supply (WO 01/11809 A1).

The pre-listening function in a DJ mixing board is usually accomplished by means of active electronic circuits. The input signal is divided and amplified separately for the headphone socket of the mixing board.

The drawbacks of such conventional DJ mixing boards are the own power supply required, the weight and the larger size, which limit mobility and flexibility and ultimately also cause higher costs.

BRIEF SUMMARY OF THE INVENTION

The object of the invention is to propose a passive DJ mixing board which can include the functions of changing the timbre, cross-fading/mixing two sources and pre-listening.

The aforesaid object is achieved by the features of claim 1. Claims 12 to 15 describe further embodiments. Advantageous embodiments are set out in the sub-claims.

According to the invention, it is proposed that in a mixing board for sound signals received on at least two channels, which mixing board can include the following circuits: a circuit for pre-listening to the sound signals through headphones that can be connected, a circuit for changing the timbre by means of a sound filter, and a circuit for cross-fading and/or mixing sound signals of the channels by means of a cross-fader, and which comprises several outputs, the sound signals received on the channels are headphone output signals of players, each channel is divided by means of circuitry and the signals are passed on to the outputs in parallel and without amplification a) through a passive sound filter and subsequently a passive cross-fader to an output to which an amplifier can be connected, and b) via a switch of the relevant channel to a headphone output of the mixing board, wherein the channels can be selected by means of the switches.

The passive DJ mixing board is designed to process only headphone signals, which have a higher current and can have a higher voltage than the standardized signals that are normally used.

The voltage losses which also occur in the passive DJ mixing board due to signal processing by means of passive sound filters are compensated for by the somewhat stronger headphone signals so that the voltage available at the output of the passive DJ mixing board is sufficient to operate amplifiers for loudspeaker systems.

The mixing board comprises at least two channels, wherein each channel can comprise several inputs which can be selectively connected to the relevant channel.

At first, the current headphone signal of the two or more signal sources is connected to the headphone output of the mixing board by means of a mechanical switch. The switches serve to select among the channels. The switches of the channels are coupled to each other in such a manner that one switch can supply a signal to the headphone output in each case while the other switch is connected to an equivalent resistance.

The received sound signal is divided ahead of the switches and is passed on in parallel through the signal processing unit (sound filter and cross-fader) and then to the output for the amplifier of the loudspeaker system.

The input signal of the passive DJ mixing board can therefore be connected directly—instead of indirectly via amplifiers as is usually the case—to two consumers: headphones for pre-listening whose resistance is approx. 8 to 100 ohms or an equivalent resistance and an amplifier of a loudspeaker system whose input resistance is approx. 10 to 20 kohms.

The equivalent resistance is preferably designed as an adjustable rotary potentiometer to be able to adapt different headphones having different resistances.

As described above, the analogue circuit of the cross-fader usually entails a voltage division.

The passive DJ mixing board proposed here is therefore provided with novel circuits which enable cross-fading or mixing without dividing the voltage in half. As a result, the signal need not be amplified.

Proposal 1

The cross-fader comprises two identical adjusters which interact with each other and are connected in parallel and which comprise a terminal for connection with the ground on one side and a terminal for the output signal on one side, and the relevant pickoff is connected to the relevant input signal, and both adjusters are controlled in phase opposition According to a preferred embodiment, the adjusters are slide potentiometers of an identical structure which are arranged parallel and symmetrically to each other and are electrically connected to each other crosswise and the slides of which are mechanically coupled to each other and can be moved in the same direction.

Proposal 2

As an alternative, each cross-fader comprises two adjusters which interact with each other and are connected in parallel and which comprise terminals for an input signal on both sides, and the pickoff of one adjuster is connected with the ground while the pickoff of the other adjuster is intended for the output signal, and both adjusters can be controlled in phase opposition.

According to a preferred embodiment, the adjusters are slide potentiometers of an identical mechanical structure which are arranged parallel to each other and are electrically connected to each other crosswise and the slides of which are mechanically coupled to each other and can be moved in the same direction.

Such embodiments of the cross-fader are not limited to the mixing board described herein, but can also be used in other mixing boards working with other input signals; for this reason, the cross-faders are separately set out in independent claims.

The proposed passive DJ mixing board allows

- to change the timbre of music available on sound recording media by means of passive sound filters,
- to cross-fade two sound signals (from one player to another) without interruption or to mix two signal sources to obtain a sum, and
- to individually listen to or check the music of the connected units through headphones that can be connected prior to the process of mixing or cross-fading.

The mixing board is normally used in consumer or home electronics or in the restaurant and food service, dance or event industry.

Implementation is based on analogue technology. The unit exclusively consists of passive electronic components.

A small portable structure makes the unit very easy to transport and flexible in use. The user needs two players comprising a headphone output, as can be found e.g. in MP3 players, CD players or mobile phones with integrated MP3 players, an amplifier including a loudspeaker, as can also be found in many areas of life, e.g. at the PC desk, in the living room, in restaurants and food service establishments, on a stage, etc., and suitable connection cables.

The mixing board according to the invention will now be explained with reference to the drawings. Only the three functions which are relevant to this mixing board will be described below, disregarding other mixing board functions that exist. Furthermore, the mixing board is of course a stereo mixing board. For simplicity of the illustration, however, only one side of the stereo signal is shown/described in the drawings and explanations.

DETAILED DESCRIPTION OF THE INVENTION

Figure 1:
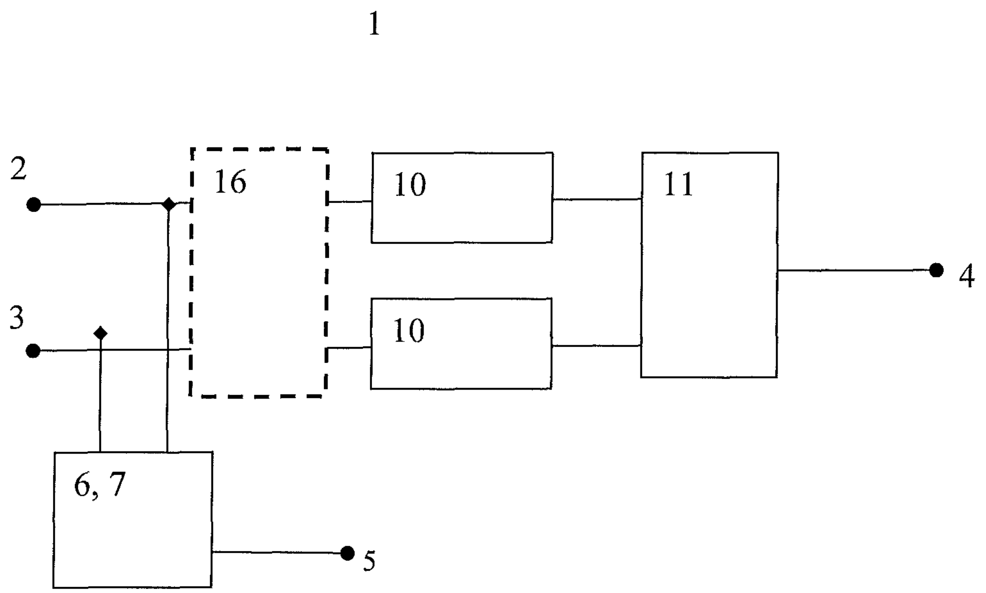
FIG. 1 shows the signal flow in the passive DJ mixing board.
Figure 9:
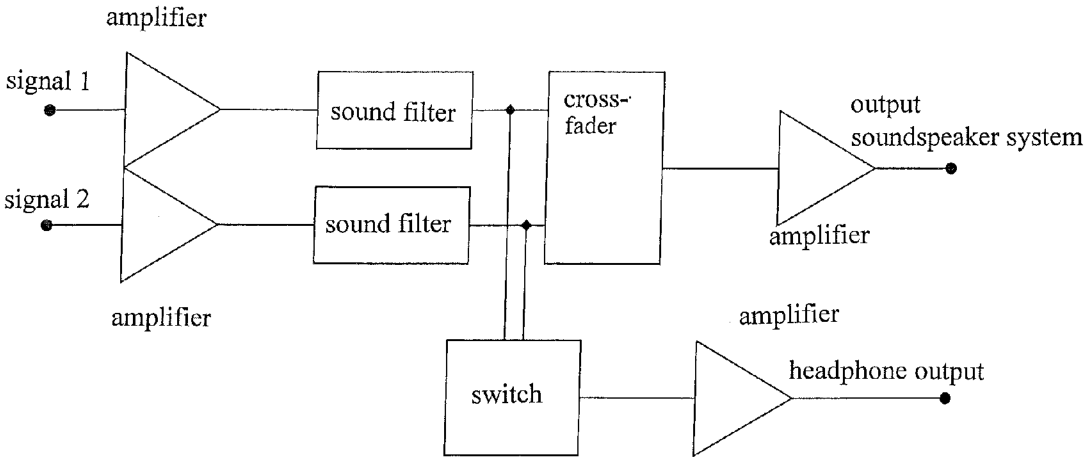
FIG. 9 shows a state-of-the-art mixing board.

FIG. 1 shows the signal flow in the passive mixing board 1. As a comparison, FIG. 9 contains an analogous illustration for a conventional mixing board.

The sound signals received on the channels 2, 3 are headphone output signals of players.

The received signal of the relevant channel 2, 3 is divided by means of circuitry and passed on to the outputs 4, 5 in parallel and without amplification, wherein said signal is passed on a) through a passive transformer 16, a passive sound filter 10 and subsequently a passive cross-fader 11 to the output 4 to the amplifier of a loudspeaker system, and b) via a switch 6, 7 of the relevant channel 2, 3 to a headphone output 5 of the mixing board 1, wherein the channels 2, 3 are selected by means of the switches 6, 7.

Figure 2:
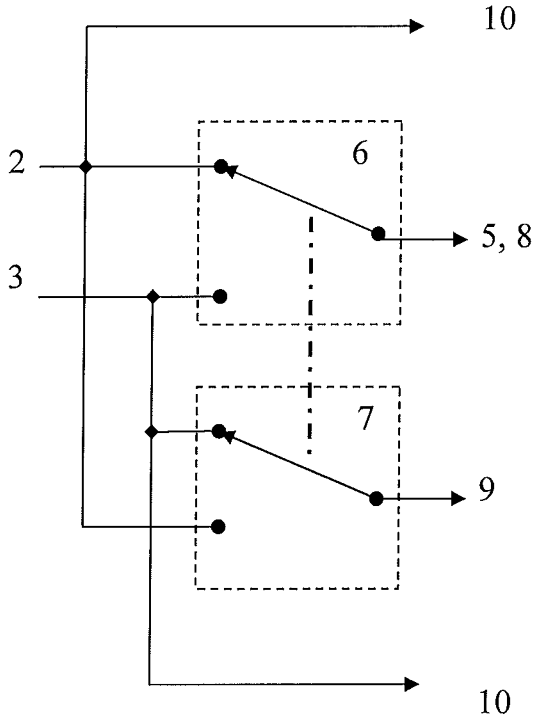
FIG. 2 shows the headphone signal/equivalent resistance switch.

FIG. 2 shows a switch combination for a headphone signal at the output 5. The switches 6, 7 of the channels 2, 3 are coupled to each other in such a manner that the switch 6 can supply a signal to the headphone output 5 from one of the channels 2, 3 while the other switch 7 connects the other channel 3, 2 to an equivalent resistance 9.

Players comprising a headphone output, such as e.g. portable MP3 players, include a small amplifier which is designed to operate commercially available headphones whose resistance is approx. 8 to 100 ohms. The signal voltage (so-called nominal voltage) which is applied to the headphones usually ranges from approx. 0.3 to 3 volts, depending on the loudness.

If no headphones are connected, the headphone amplifier of the player usually delivers a somewhat higher voltage (so-called no-load voltage) than if headphones are connected. In other words this means that the output voltage may reduce to a certain degree or break down if there is load due to the headphone resistance. The extent to which the voltage of the signal reduces under load can vary widely or also be controlled automatically, depending on the resistance of the headphones and the technical implementation or quality of the headphone amplifier.

If the switch 6 was now switched to channel 3 from a switching state where the headphone signal received on channel 2 is connected to the amplifier of the loudspeaker system via the sound filter(s) 10 and the cross-fader 11 and at the same time the signal received on channel 2 is heard at the headphone output 5, the load of approx. 8 to 100 ohms presented by the headphones 8 would be eliminated; as a result, the no-load voltage—instead of the nominal voltage—would suddenly be present at the output of the amplifier for the loudspeaker system, i.e. the signal would become louder at the loudspeaker system, which is not desired.

To ensure that the signal applied to the output 4 for the amplifier of the loudspeaker system is kept constant, a preferred embodiment of the passive DJ mixing board 1 includes an equivalent resistance 9 which is intended to simulate the headphones 8 each time when a switch is made from one channel 2, 3 to the other. This ensures that the output voltage for the loudspeaker system is maintained at a constant level. The switches 6 and 7 are therefore mechanically connected to each other as shown.

The equivalent resistance 9 should be similar to the resistance of the headphones 8; the equivalent resistance 9 can preferably be adjusted, e.g. be an adjustable rotary potentiometer.

Furthermore, an anti-short-circuit resistance is connected ahead of the equivalent resistance 9.

Figure 3:
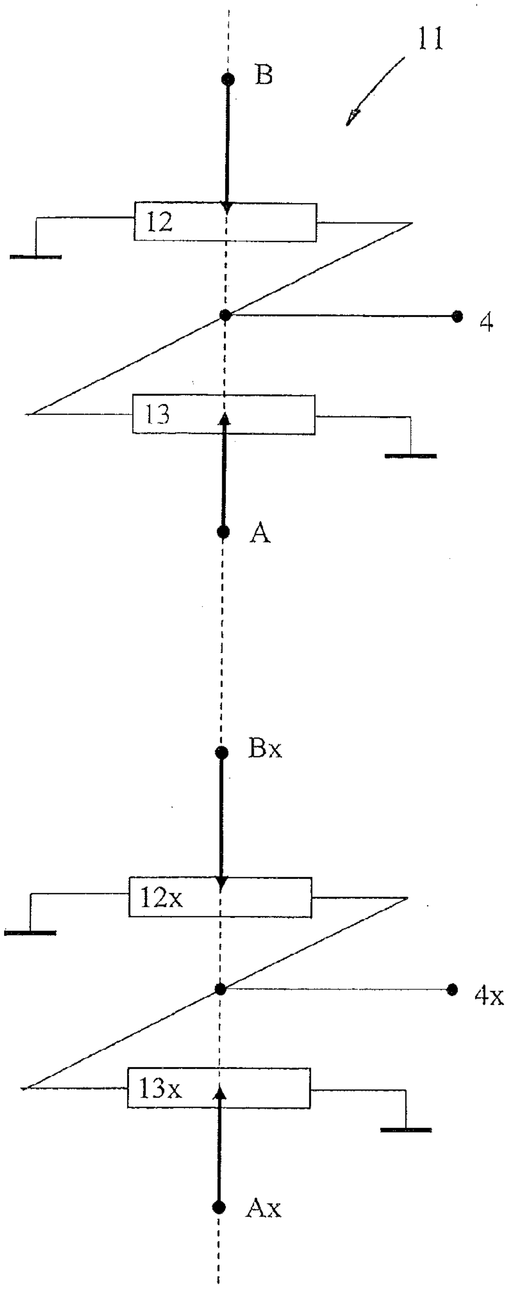
FIG. 3 shows the cross-fader.

FIG. 3 shows a preferred embodiment of the cross-fader 11 with the left signal shown in the upper part of the figure and the right signal in the lower part of the figure, wherein the letter "x" is used to indicate the second signal of stereo sound. The cross-fader 11 comprises four identical adjusters 12, 13, 12*x*, 13*x* which interact with each other and are connected in parallel and each two of which comprise a terminal for connection with the ground on one side and a terminal for the output signal 4 on one side. The relevant pickoff is connected to the relevant input signals A, B. Each two adjusters 12, 13, and 12*x*, 13*x* are controlled in phase opposition.

The adjusters 12 and 13 illustrated here are slide potentiometers which are arranged parallel and symmetrically to each other and are electrically connected to each other crosswise and the slides of which are mechanically coupled to each other and can be moved in the same direction.

If the adjuster is in the leftmost position, signal A is applied to the output 4 and signal B is connected with the ground, i.e. not present at the output 4. If the adjuster is in the rightmost position, signal B is applied to the output 4 and A is connected with the ground, i.e. not present at the output 4.

Over the entire range between the two end positions, the signals from the inputs A and B are simultaneously present at the output 4. There is no voltage division.

Starting from an end position, the respective other signal continuously increases in proportion to the distance that is covered, wherein optimally both input signals are 100 percent present at the output if 50% of the distance has been covered.

Figure 4:
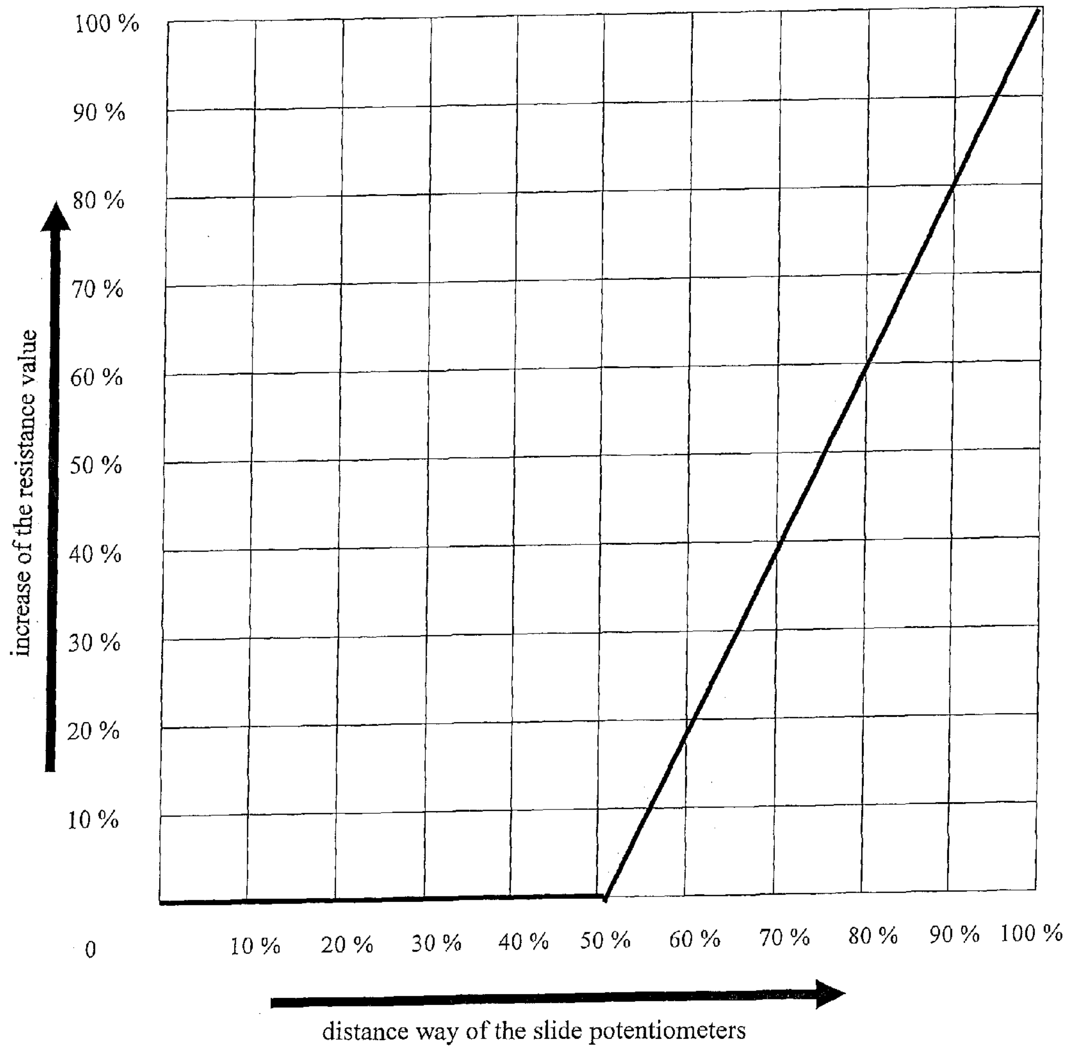
FIG. 4 shows characteristics of the adjuster.

The resistance value of the symmetrical adjusters 12, 13 is optimally zero in value from the end where the output signal 4 is present until half of the distance has been covered in each case. Once 50% of the distance has been covered, the resistance value increases as more distance is covered. This is illustrated in FIG. 4 by means of a linear curve.

Depending on the requirements placed on the cross-fader 11, the resistance can increase in a linear, logarithmic or inverse logarithmic fashion.

Figure 5:
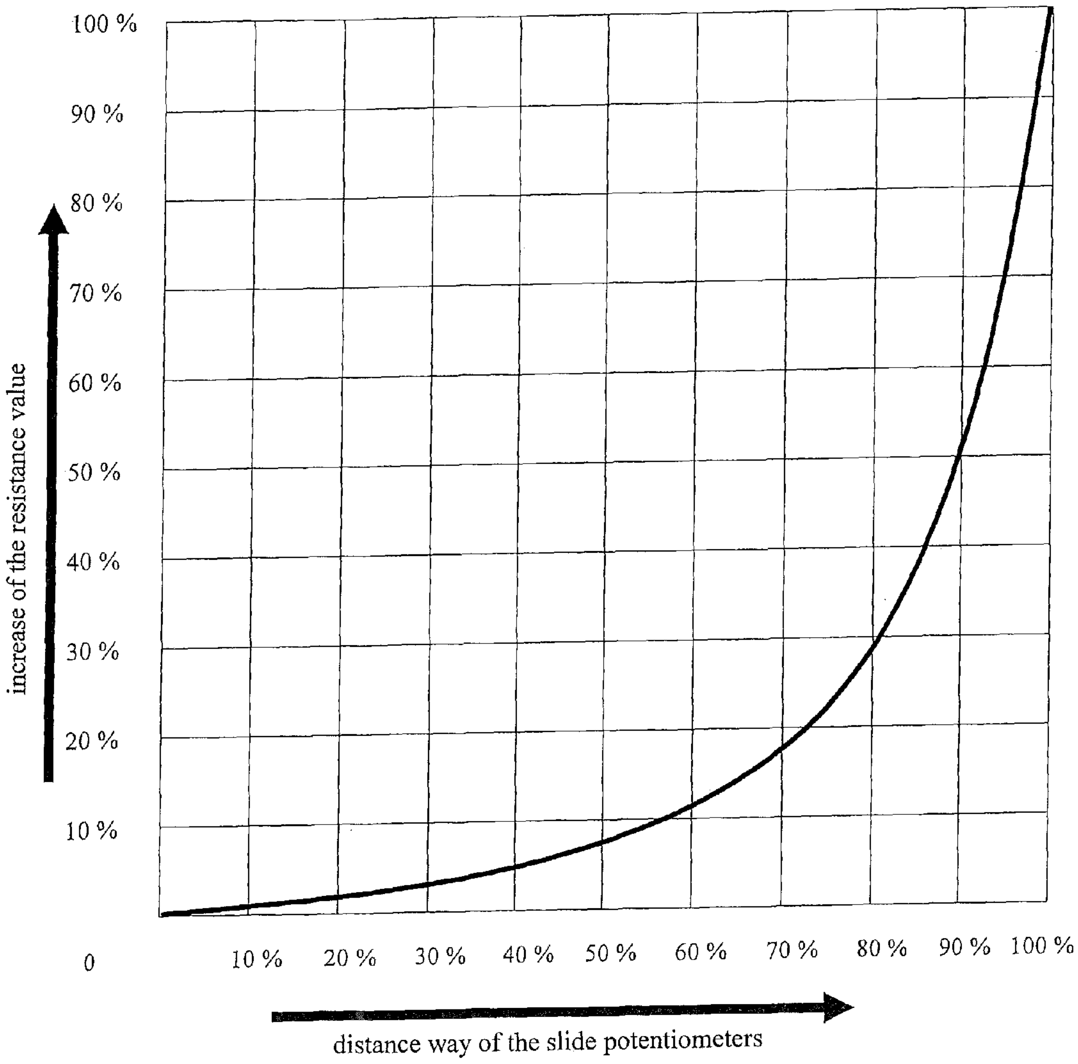
FIG. 5 shows further characteristics of the adjuster.

Moreover, the resistance value of the symmetrical adjusters 12, 13 can present a flat increase from the end where the output signal 4 is present until half of the distance has been covered and a steep increase as more distance is covered. This is illustrated in FIG. 5.

Figure 6:
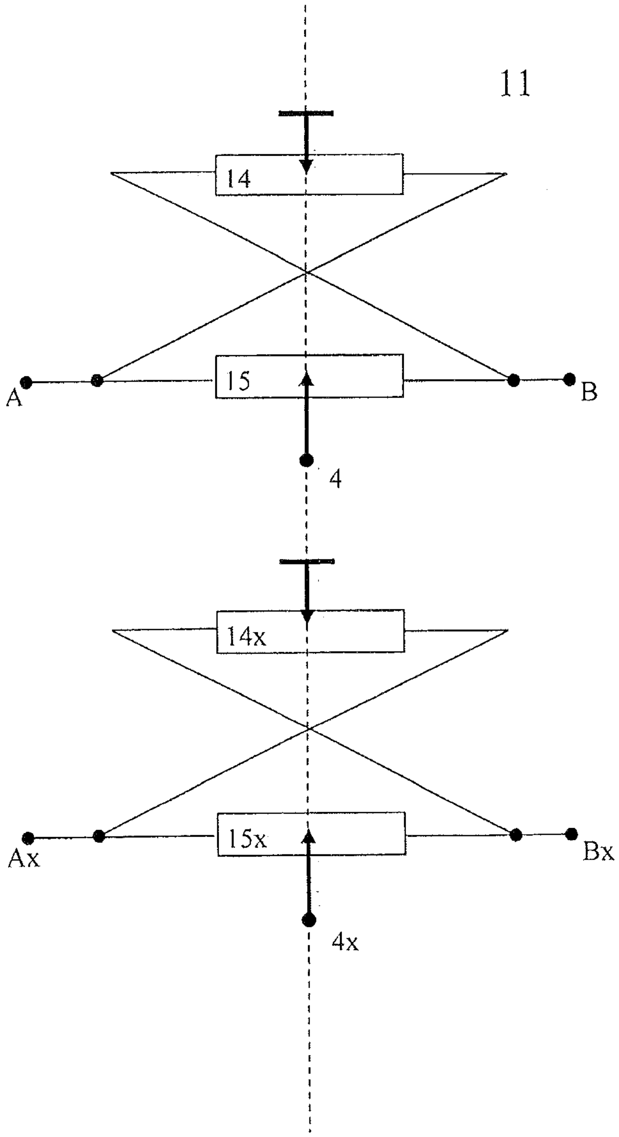
FIG. 6 an alternative cross-fader.

FIG. 6 shows another embodiment of the cross-fader 11 with the left signal shown in the upper part of the figure and the right signal in the lower part of the figure, wherein the letter "x" is used to indicate the second signal of stereo sound.

This embodiment of the cross-fader 11 comprises each two different adjusters 14, 15 and 14*x*, 15*x* which interact with each other and are connected in parallel and each two of which comprise terminals for an input signal on both sides and the pickoff on 14, 14*x* is connected to ground while the pickoff on 15, 15*x* is connected to the relevant output 4, 4*x*.

The pickoff of the adjuster 14 is connected with the ground while the pickoff of the other adjuster 15 is intended for the output signal. Both adjusters 14, 15 are controlled in phase opposition.

The adjusters 14, 15 illustrated here are slide potentiometers which are arranged parallel to each other and are electrically connected to each other crosswise and the slides of which are mechanically coupled to each other and can be moved in the same direction.

If the adjuster is in the leftmost position, signal A is applied to the output 4 and signal B is connected with the ground, i.e. not present at the output 4. If the adjuster is in the rightmost position, signal B is applied to the output and A is connected with the ground, i.e. not present at the output 4.

In both end positions—the leftmost or rightmost position—, there is no voltage division between the input A or B and the output 4. The voltage level of the input signal is 100 percent that of the output signal.

Over the entire range between the two end positions, there is voltage division and the signals from the inputs A and B are simultaneously present at the output 4.

To obtain the highest possible output signal in spite of voltage division, but not a too rapid signal increase in proportion to the distance covered by the cross-fader 11, the resistance value of the adjuster 14 whose pickoff is connected with the ground is several times the resistance value of the adjuster 15 with pickoff for the output signal, and in addition the adjusters 14 and 15 have a non-linear curve.

Figure 7:
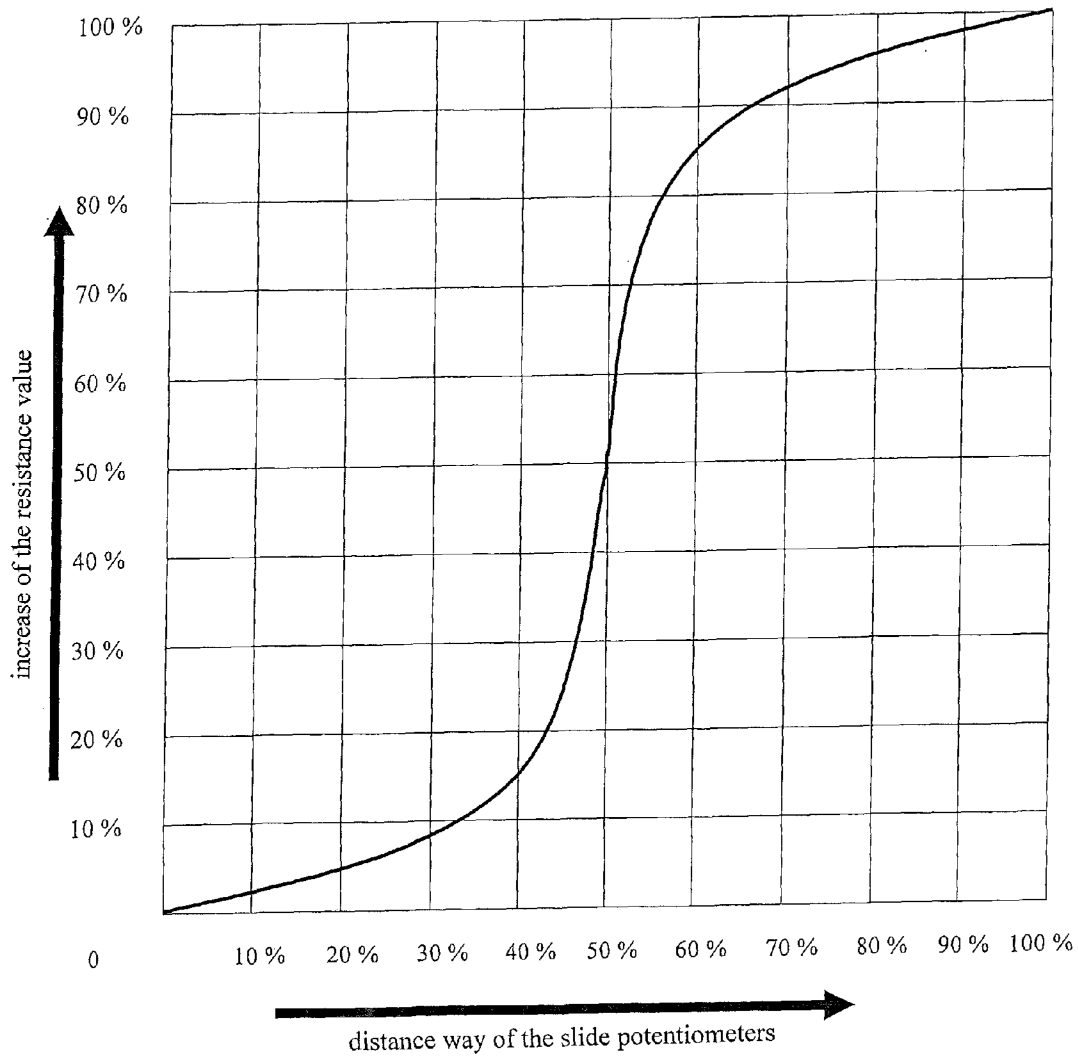
FIG. 7 shows characteristics of the alternative adjuster.

To enable a slow increase of the respective other signal, starting from an end position until the middle position of the cross-fader 11 is reached, the resistance values of the adjusters 14 and 15 must form a flat curve in the initial and final ranges and a steep curve in the intermediate range. This is illustrated in FIG. 7.

As an option, a transformer can be connected following the division of the signal by means of circuitry and before the signal is passed on to the output 4 through the sound filter and cross-fader, which transformer increases the voltage of the signals A and B for signal processing in the sound filter 10.

Figure 8:
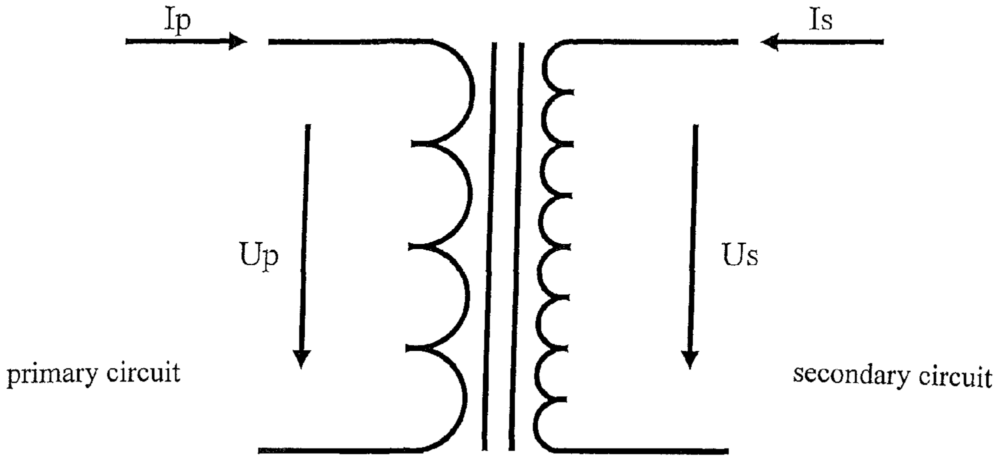
FIG. 8 shows characteristics of the transformer.

The transformer 16 is illustrated in FIG. 8 and has the following properties:

The number of windings in the secondary circuit is several times the number of windings in the primary circuit.

The primary circuit is low-resistive, the secondary circuit is high-resistive.

The voltage Us is several times the voltage Up, the current Ip is several times the current Is.

LIST OF REFERENCE NUMERALS

1 Mixing board
2 Channel for the headphone signal of the 1st player
3 Channel for the headphone signal of the 2nd player
4 Output to the amplifier of a loudspeaker system
5 Output to the headphones
6 Switch in channel 2
7 Switch in channel 3
8 Headphones
9 Equivalent resistance corresponding to headphones
10 Sound filter
11 Cross-fader
12 Adjuster in cross-fader
13 Adjuster in cross-fader
14 Adjuster in cross-fader
15 Adjuster in cross-fader
16 Transformer

The invention claimed is:

1. An electrically analog and entirely passive stereo mixing board for sound signals received on at least two stereo channels, which does not include a power supply and which includes a combination of the following circuits:

a first circuit for pre-listening to the sound signals through headphones that can be connected, a second circuit for changing the timbre by means of a sound filter, and a third circuit for cross-fading or mixing sound signals of the channels by means of a cross-fader, and which comprises several outputs, wherein the sound signals received on the stereo channels (2, 3) are headphone output signals of players, the relevant channels (2, 3) are stereo channels with two tracks each and are divided by means of dividing circuitry and the signals are passed on to the outputs (4, 5) in parallel and without amplification a) through a passive sound filter (10) and subsequently a passive cross-fader (11) to an output (4) to which an amplifier can be connected, wherein the cross-fader (11) comprises four identical adjusters (12, 13, 12*x*, 13*x*) which interact with each other and each two of which are connected in parallel and controlled in phase opposition and b) via a switch (6, 7) of the relevant stereo channel (2, 3) to a stereo headphone output (5) of the passive stereo mixing board (1), wherein the channels (2, 3) can be selected by means of the switches (6, 7).

2. The passive stereo mixing board according to claim 1, wherein the switches (6, 7) of the channels (2, 3) are coupled to each other in such a manner that one switch (6) or (7) can supply a stereo signal to the headphone output (5) while the other switch (7) or (6) is connected to an equivalent resistance (9) to keep the signal on the output (4) of the passive mixing board on a steady level.

3. The passive stereo mixing board according to claim 2, wherein the equivalent resistance (9) is similar to the resistance of the headphones (8) and can be adjusted and is preferably an adjustable rotary potentiometer.

4. The passive stereo mixing board according to claim 1, wherein a transformer 16 is connected following the division of the signal by means of circuitry and before the signal is passed on to the output 4 through the sound filter and cross-fader, which transformer increases the voltage of the headphone signals.

5. The passive stereo mixing board according to claim 1, wherein the cross-fader (11) comprises four identical adjusters (12, 13, 12*x*, 13*x*) which interact with each other and are connected in parallel and which comprise two terminals for connection with the ground on one side and two terminals for the output signal (4, 4*x*) on one side, and the two relevant pickoffs are connected to the relevant input signal.

6. The passive stereo mixing board according to claim 5, wherein the four adjusters (12, 13, 12*x*, 13*x*) are slide potentiometers which are arranged parallel and symmetrically to each other and each two of which are electrically connected to each other crosswise and the slides of which are mechanically coupled to each other and can be moved in the same direction.

7. The passive stereo mixing board according to claim 5, wherein the resistance value of the symmetrical adjusters (12, 13, 12*x*, 13*x*) is zero in value until half of the distance has been covered in each case, and once half of the distance has been covered increases in a linear, logarithmic or inverse logarithmic fashion as more distance is covered.

8. The passive stereo mixing board according to claim 5, wherein the resistance value of the symmetrical adjusters (12, 13, 12*x*, 13*x*) presents a flat increase from the end where the output signal (4, 4*x*) is present until half of the distance has been covered and a steep increase as more distance is covered.

9. An electrically analog and entirely passive stereo mixing board for sound signals received on at least two stereo channels, which includes a combination of the following circuits:

a first circuit for pre-listening to the sound signals through headphones that can be connected, a second circuit for changing the timbre by means of a sound filter, and a third circuit for cross-fading or mixing sound signals of the channels by means of a cross-fader, and which comprises several outputs, wherein the sound signals received on the stereo channels (2, 3) are headphone output signals of players, the relevant channels (2, 3) are divided by means of dividing circuitry and the signals are passed on to the outputs (4, 5) in parallel and without amplification a) through a passive sound filter (10) and subsequently a passive cross-fader (11) to an output (4) to which an amplifier can be connected, and b) via a switch (6, 7) of the relevant stereo channel (2, 3) to a headphone output (5) of the passive stereo mixing board (1), wherein the channels (2, 3) can be selected by means of the switches (6, 7) and wherein the cross-fader (11) comprises each of two different adjusters (14, 15 and 14*x*, 15*x*) which interact with each other and each of two of which are connected in parallel and controlled in phase opposition and which comprise terminals for two input signals on both sides, and two pickoffs of one adjuster (14, 14*x*) are connected with a ground while the pickoffs of the other adjuster (15, 15*x*) are intended for output signal.

10. The passive stereo mixing board according to claim 9, wherein the adjusters X14, 14*x* and 15, 15*x*) are slide potentiometers which are arranged parallel to each other and each of the two of which are electrically connected to each other crosswise and the slides of which are mechanically coupled to each other and can be moved in the same direction.

11. The passive stereo mixing board according to claim 9, wherein the resistance values of the adjusters (14, 14*x* and 15, 15*x*) and (15) form a flat curve in the initial and final ranges and a steep curve in the intermediate range.

12. An analog stereo passive mixing board comprising at least one cross-fader (11), wherein the cross-fader (11) comprises four identical adjusters (12, 13, 12*x*, 13*x*) which interact with each other and each two of which are connected in parallel and which comprise two terminals for connection with a ground on one side and two terminals for an output signal (4) on a second side, and relevant pickoffs are connected to relevant input signals, And each of two adjusters are controlled in phase opposition.

13. The analog stereo passive mixing board according to claim 12, wherein the adjusters (12, 13, 12*x*, 13*x*) are slide potentiometers which are arranged parallel and symmetrically to each other and are electrically connected to each other crosswise and the slides of which are mechanically coupled to each other and can be moved in the same direction.

14. An analog stereo passive mixing board comprising at least one cross-fader (11), wherein the cross-fader (11) comprises each two different adjusters (14, 15 and 14*x*, 15*x*) which interact with each other and are connected in parallel and which comprise terminals for input signals on both sides, and pickoffs of adjusters (14, 14*x*) are connected with a ground while pickoffs of the adjuster (15, 15*x*) are intended for stereo output signal, and each of the two adjusters (14, 15 and 14*x*, 15*x*) are controlled in phase opposition.

15. The analog stereo passive mixing board according to claim 14, wherein the adjusters (14, 14*x* and 15, 15*x*) are slide potentiometers which are arranged parallel to each other and are electrically connected to each other crosswise and the slides of which are mechanically coupled to each other and can be moved in the same direction.

16. The analog stereo passive mixing board according to claim 12, wherein the resistance value of the symmetrical identical adjusters (12, 12*x* and 13, 13*x*) is zero in value until half of the distance of movement has been covered in both of the identical adjusters (12, 12*x* and 13, 13*x*) and once half of the distance has been covered increases in resistance are linear, logarithmic or inverse logarithmic fashion as more distance is covered.

17. The analog stereo passive mixing board according to claim 12, wherein the resistance value of the identical adjusters (12, 12*x* and 13, 13*x*) presents a flat increase from the end where the movement distance where the output signal (4) is to be connected until half of the distance of movement has been covered and a steep increase as more movement distance is covered.

18. The analog stereo passive mixing board according to claim 12, wherein the resistance values of the adjusters (14, 14*x* and 15, 15*x*) form a flat curve in the initial and final stages of the movement of the adjuster and a steep curve in the intermediate range.

* * * * *